United States Patent [19]

Kenyon et al.

[11] Patent Number: 4,843,562

[45] Date of Patent: Jun. 27, 1989

[54] BROADCAST INFORMATION CLASSIFICATION SYSTEM AND METHOD

[75] Inventors: Stephen C. Kenyon, Stafford, Va.; Laura J. Simkins, Clarksburg, Md.; Richard L. Sebastian, Lorton, Va.

[73] Assignee: Broadcast Data Systems Limited Partnership, New York, N.Y.

[21] Appl. No.: 66,106

[22] Filed: Jun. 24, 1987

[51] Int. Cl.$^4$ .................... G06F 15/31; H04N 7/00
[52] U.S. Cl. ................. 364/487; 358/84; 364/604; 381/42; 381/43
[58] Field of Search ............ 358/84; 381/42, 43; 364/604, 728, 487, 513.5; 382/34; 455/2

[56] References Cited

U.S. PATENT DOCUMENTS

| | | | |
|---|---|---|---|
| 3,919,479 | 11/1975 | Moon et al. | 358/84 |
| 4,059,725 | 11/1977 | Sakoe | 364/513.5 |
| 4,100,370 | 7/1978 | Suzuki et al. | 381/42 |
| 4,153,897 | 5/1979 | Uasuda et al. | 382/34 |
| 4,209,835 | 6/1980 | Guadagnolo | 364/728 |
| 4,227,046 | 10/1980 | Nakajima et al. | 381/42 |
| 4,230,990 | 10/1980 | Lert, Jr. et al. | 358/84 |
| 4,282,403 | 8/1981 | Sakoe | 364/513.5 |
| 4,297,528 | 10/1981 | Beno | 381/45 |
| 4,317,109 | 2/1982 | Odaka et al. | 382/13 |
| 4,384,273 | 5/1983 | Ackland et al. | 381/43 |
| 4,394,538 | 7/1983 | Warren et al. | 381/43 |
| 4,400,738 | 8/1983 | Tomory et al. | 358/283 |
| 4,400,788 | 8/1983 | Myers et al. | 381/43 |
| 4,403,114 | 9/1983 | Sakoe | 381/42 |
| 4,432,096 | 2/1984 | Bunge | 381/43 |
| 4,450,531 | 5/1984 | Kenyon et al. | 358/84 |
| 4,454,586 | 6/1984 | Pirz et al. | 364/513.5 |
| 4,479,236 | 10/1984 | Sakoe | 381/43 |
| 4,499,601 | 2/1985 | Matthews | 455/2 |
| 4,506,378 | 3/1985 | Noso et al. | 381/43 |
| 4,519,094 | 5/1985 | Brown et al. | 381/43 |
| 4,521,909 | 6/1985 | Wang | 382/34 |
| 4,559,604 | 12/1985 | Ichikawa et al. | 381/43 |
| 4,571,697 | 2/1986 | Watanabe | 381/43 |
| 4,601,054 | 7/1986 | Watari et al. | 381/42 |
| 4,639,779 | 1/1987 | Greenberg | 358/84 |
| 4,677,466 | 6/1987 | Lert, Jr. et al. | 358/84 |
| 4,697,209 | 9/1987 | Kiewit et al. | 358/84 |

FOREIGN PATENT DOCUMENTS 0210609 2/1987 European Pat. Off. .

Primary Examiner—Parshotam S. Lall
Assistant Examiner—Kevin J. Teska
Attorney, Agent, or Firm—Fitzpatrick, Cella, Harper & Scinto

[57] ABSTRACT

Method and apparatus for classifying broadcast information first receives the broadcast information and processes it to provide a plurality of a low bandwidth analyzed waveforms. The analyzed waveforms are used to generate a spectragram which is then compared with a plurality of reference spectragrams stored in a first stage reference library. The first stage reference spectragrams are then queued in order of their similarity to the generated spectragram. Next, a plurality of second stage reference patterns, which correspond to the first stage reference spectragrams, are correlated with one of the analyzed waveforms in the queueing order established previously. A correlation value is provided for each second stage reference pattern stored in the second stage reference library. When it is determined that a correlation value exceeds the threshold value, a recognition is declared and the broadcast information is classified as similar to the second stage reference pattern whose correlation value exceeds the threshold. The analyzed waveform used in the second stage classification may be time warped to account for speed fluctuations in the broadcast information.

66 Claims, 7 Drawing Sheets

BROADCAST INFORMATION CLASSIFICATION SYSTEM AND METHOD

BACKGROUND OF THE INVENTION

This invention relates to apparatus and method by which broadcast information can be recognized and classified. More particularly, this invention relates to a system and method for classifying broadcast information using a plurality of reference signal libraries in a two-stage classification process.

It is known that broadcast stations (television and radio) are regularly monitored to determine when and how often certain information is broadcast. For example, artists may be paid a royalty rate depending upon how often their particular work is broadcast. Likewise, commercial backers of broadcast programming have an interest in determining when and how often commercials are played. Further, marketing executives and the broadcasters themselves are interested in determining the popularity of certain broadcast information in order to target that information to the appropriate audience at the appropriate time. Those of ordinary skill in this field will readily understand that a wide variety of legal, economic and social concerns require the regular monitoring of broadcast information. All such requirements share a common need for certain information such as which information was broadcast and when.

Traditionally, such broadcast station monitoring was performed manually by a plurality of listeners who would physically monitor the broadcast program and manually tabulate which information was broadcast and when. However, the cost of these manual surveys has become prohibitive. Such a method is labor intensive and subject to reliability problems. For example, a manual monitor may easily miss a fifteen second commercial broadcast over radio. In addition, it is virtually impossible for a single individual to monitor a plurality of broadcast channels. Therefore, a great number of monitors has been traditionally required to fully monitor performance in a multi-media environment.

In view of the above problems with manual systems, it has been proposed to design and implement an automatic broadcast recognition system. It is believed that such automatic systems will be less expensive and more reliable than manual surveys.

In recent years, several techniques and systems have been developed which electronically monitor broadcast signals and provide information relative to the content and timing of the program monitored. Initially, these automatic systems performed signal recognition by inserting a code signal in the broadcast signal itself. Upon reception, the automatic system would recognize the code signal (matching it with a reference library) and classify the broadcast information accordingly. Although such coding techniques work for limited applications, they require allocation of portions of the broadcast signal band for identification purposes. In addition, such a system requires special processing, coding and decoding circuitry. Such circuitry is expensive to design and assemble and must be placed at each transmitting and receiving station. In addition, those of skill in this field understand that government regulatory agencies are adverse to providing additional bandwidth for purposes of code signal identification.

To overcome some of the disadvantages involved with the use of the coded signal techniques, certain automatic broadcast signal identification systems have been developed which do not require special coding of the broadcast signal. Such a system is disclosed in U.S. Pat. No. 3,919,479 to Moon et al. In Moon et al, an audio signal is digitally sampled to provide a reference signal segment which is stored in a reference library. Then, when the audio signal is broadcast, successive portions thereof are digitized and compared with the reference segment in the library. The comparison is carried out in a correlation process which produces a correlation function signal. If the reference and broadcast signal segments are not the same, a correlation function with a relatively small amplitude results. On the other hand, if the reference and broadcast signal segments are relatively the same, a large correlation function signal is produced. The amplitude of the correlation function signal is sensed to provide a recognition signal when the amplitude exceeds a predetermined threshold level.

While the Moon et al system may operate effectively in certain situations, it is not effective for many applications. For example, where signal drop-out is experienced, a single segment correlation system may be severely degraded or disabled all together. Additionally, the Moon et al system is relatively insensitive to time-axis variations in the broadcast information itself. For example, it is known that many disc-jockeys "compress" broadcast songs by speeding-up the drive mechanism. It is also known that other disc-jockeys regularly "compress" and/or "stretch" broadcast information to produce certain desired effects in the audience.

In an attempt to overcome such time-axis variations, Moon proposes to reduce the bandwidth of the broadcast signal by envelope-detecting the broadcast signal and providing envelope signals having substantially low, and preferably sub-audio frequency signal components. It has been found that when the envelope signal at sub-audio frequencies is used during the correlation process, the digitally sampled waveforms are less sensitive to time-axis variations. However, the improvements which can be achieved by such a solution are very limited and will only operate for broadcast signals which have been "compressed" or "stretched" by a small amount. In addition, such a solution is subject to high false alarm rates. These disadvantages make the Moon et al system less than desirable for a rapid, accurate, and inexpensive broadcast information recognition system.

Another automatic signal recognition system is disclosed in U.S. Pat. No. 4,450,531 to Kenyon et al. Mr. Kenyon is a joint inventor of the subject application and the '531 patent. The teachings of the '531 patent are hereby incorporated into this application by reference.

The Kenyon et al system successfully addresses the reliability problems of a single segment correlation system, and the time-axis variation problems experienced by prior systems. In Kenyon et al, a plurality of reference signal segments are extracted from a program unit (song), digitized, Fourier transformed and stored in a reference library in a frequency domain complex spectrum. The received broadcast signal is then prefiltered to select a frequency portion of the audio spectrum that has stable characteristics for discrimination. After further filtering and conversion to a digital signal, the broadcast signal is Fourier transformed and subjected to a complex multiplication process with reference signal segments to obtain a vector product. The results of the complex multiplication process are then subjected to an inverse Fourier transformation step to obtain a correlation function which has been transformed from the frequency to the time domain. This correlation function is then normalized and the correlation peak for each segment is selected and the peak spacing is compared with segment length. Simultaneously, the RMS power of the segment coincident with the correlation peak segment is sensed to determine the segment power point pattern. Thus, Kenyon et al overcomes the disadvantages of a single segment correlation system by providing a plurality of correlation segments and measuring the distances between correlation peaks. Where the distances match, the broadcast signal is declared as being similar to the signal segments stored in the reference library. In addition, the RMS value comparison operates to confirm the classification carried out using the signal segments.

To overcome the time-axis variation problem, Kenyon et al utilizes an envelope detector and band pass filtering of the broadcast information, similar to the system of Moon et al. In addition, Kenyon et al, proposes the use of more than one sampling rate for the reference signal segments. A fast and slow sample may be stored for each reference signal segment so that broadcast signals from faster rate stations will correlate with the faster rate reference segments and signals from slower rate stations will correlate with the slower rate reference segments. However, the system according to Kenyon et al also suffers from a relatively high false alarm rate and is computationally very demanding. For example, performing the various multi-segment correlations requires a great deal of computer power. Since a multitude of segments are sampled, the system according to Kenyon et al may take a good deal of time and require the use of expensive, powerful computers.

A system for speech pattern recognition is disclosed in U.S. Pat. No. 4,282,403 to Sakoe. Sakoe discloses a speech recognition system in which a time sequence input of pattern feature vectors is inputted into a reference library. The received speech signal is then subjected to spectrum analysis, sampling and digitalization in order to be transformed into a timed sequence of vectors representative of features of the speech sound at respective sampling instances. A time warping function may be used for each reference pattern by the use of feature vector components of a few channels. The time warping function for each reference pattern feature vector is used to correlate the input pattern feature vector and the reference pattern feature vector. The input pattern feature vector sequence is then compared with the reference pattern feature vector sequence, with reference to the warping function, in order to identify the spoken word. However, the Sakoe system time warps the reference patterns rather than the input signal. Thus, a plurality of patterns must be calculated for each reference pattern, necessarily increasing the memory and computational requirements of the system.

A further signal recognition system is disclosed in U.S. Pat. No. 4,432,096 to Bunge. In Bunge, sounds or speech signals are converted into an electrical signal and broken down into several spectrum components in a filter bank. These components are then integrated over a short period of time to produce the short-time spectrum of a signal. The spectral components of the signal are applied to a number of pattern detectors which supply an output signal only if the short-time spectrum corresponds to the pattern adjusted in the relevant pattern detector. Each pattern detector has two threshold detectors which supply a signal if the applied input lies between the adjustable thresholds. Thus, the pattern detectors supply an output signal only if all threshold value detectors are activated. For each sound of speech, a pattern detector is provided. When a series of sounds is recognized, the series of addresses of the pattern detectors which have successfully generated an output signal are stored and subsequently applied to the computer for comparison. It can be readily appreciated that such a system requires a number of pattern detectors and a corresponding powerful computation device. In addition, while the Bunge system uses a filter bank to provide a low frequency output signal which is relatively less sensitive to time-axis variations, the Bunge system is still subject to time distortion problems and a high false alarm rate.

Known automatic broadcast recognition systems have been caught in a quandary of choosing an appropriate time-bandwidth (sampling time times frequency band width) product. Where the broadcast signal is sampled with a large time-bandwidth product, signal recognition may be made accurately. However, when a suitably large time-bandwidth product is employed, it will be extremely sensitive to time-axis variations. Thus, most known systems utilize a predetermined time-bandwidth product and suffer recognition inaccuracies and time-axis variations. In addition, the computational load imposed by all known techniques severely limits the number of songs or other recordings that can be simultaneously sampled in real time.

Thus, what is needed is a small, inexpensive system with limited processing power which automatically monitors a plurality of broadcast channels simultaneously for a large number of sounds. Such a system should provide accurate recognition and, at the same time, remain relatively insensitive to time-axis variations.

SUMMARY OF THE INVENTION

The present invention is designed with a view toward overcoming the disadvantages of known automatic broadcast information recognition systems while at the same time satisfying the objectives alluded to above.

The present inventors have discovered that an inexpensive, reliable and accurate automatic information classification system may be achieved by utilizing a two-stage classification process. First, known broadcast information (a song or commercial) is "played into" the system in order to generate first and second stage reference libraries. Once the libraries have been generated, broadcast information is monitored by the system. In the first stage classification, the input signal is spectrally analyzed and filtered to provide several low bandwidth analog channels. Each of these channels is fed to a feature generator where it is digitized to form a feature data set that is analyzed to determine if it matches one of the patterns in the first stage reference library. In a preferred embodiment the feature generator forms a multi-channel sequence by computing linear combinations of the input channels. Each of these feature sequences is then smoothed using a moving average filter, further reducing the bandwidth. These reduced bandwidth sequences are then resampled to form a feature set of very low bandwidth but long duration. These sequences are grouped into a spectragram and used in the first stage classification process to rule out unlikely candidates in the first stage reference library. In addition, the feature generator generates an additional feature sequence which will be used in the second stage classification process.

Preferably each spectragram is a time/frequency matrix having a plurality of elements. Likewise, the first stage reference patterns are also preferably time/frequency matrices having the same number of elements as the generated spectragram. The first stage classification process then compares the generated spectragram with the first stage reference spectragram. The reference spectragram may be visualized as a template which is "laid-over" the generated spectragram so that corresponding matrix elements match. Then, the difference between corresponding elements of the generated spectragram and the first stage reference spectragram is measured to determine the similarity between the generated spectragram and the reference spectragram. Then, the sum of the element differences for the entire spectragram is obtained to provide a difference measurement between the generated spectragram and the first stage reference spectragram. This difference computation is repeated for each pattern in the first stage reference library. Songs having a difference measurement less than a threshold value are considered to be candidate identifications. Those with difference measurements greater than a threshold value are rejected as being not similar to the broadcast information.

The first stage reference patterns which have not been rejected in the first stage classification process are then queued according to their difference measurements. Thus, the queueing order places the most similar first stage reference pattern at the head of the queue.

Next, the second stage reference classification process is carried out in the queueing order established in the first stage classification process. The second stage reference library contains a number of signal patterns which correspond 1-to-1 with the entries of the first stage reference library. The second stage reference patterns are queued in the order established in the first stage classification process, and then correlated with the additional feature sequence provided from the feature generator. This additional feature sequence does not have as low a bandwidth as the feature sequence used in the first stage classification process. In a preferred embodiment, a cross correlation is conducted between the additional feature sequence and the second stage reference patterns in the queueing order. If the peak correlation value for any of the cross-correlations exceeds a detection threshold, the broadcast information is classified as being similar to the information represented by the second stage reference pattern. At this time a recognition may be declared and the time, date and broadcast information identification, and broadcast information source may be entered in a detection log.

By performing the computationally demanding cross-correlation in the queueing order established in the less-demanding first stage classification process, processing resources are conserved and the computer power required to classify broadcast information is significantly reduced.

To account for time-axis variations in the broadcast information, a preferred embodiment may include a "time-warping" function for use in the second stage classification process. Specifically, the additional feature sequence provided to the second stage classification process may be "compressed" and/or "stretched" to account for variations in broadcast speed. Then, the second stage correlation process correlates the second stage reference pattern with the unmodified additional feature sequence, with a "compressed" additional feature sequence, and/or with a "stretched" additional feature sequence. Therefore, proper identification can take place even if the broadcast information is broadcast more rapidly or more slowly than intended.

BRIEF DESCRIPTION OF THE DRAWINGS

The advantageous features according to the present invention will be readily understood from the description of the presently preferred exemplary embodiment when taken together with the attached drawings in which.

DETAILED DESCRIPTION OF THE PRESENTLY PREFERRED EXEMPLARY EMBODIMENT

While the present invention will be described with reference to a broadcast music classification system, those with skill in this field will appreciate that the teachings of this invention may be utilized in a wide variety of signal recognition environments. For example, the present invention may be utilized with radio, television, data transfer and other broadcast systems. Therefore, the appended claims are to be interpreted as covering all such equivalent signal recognition systems.

Figure 9:
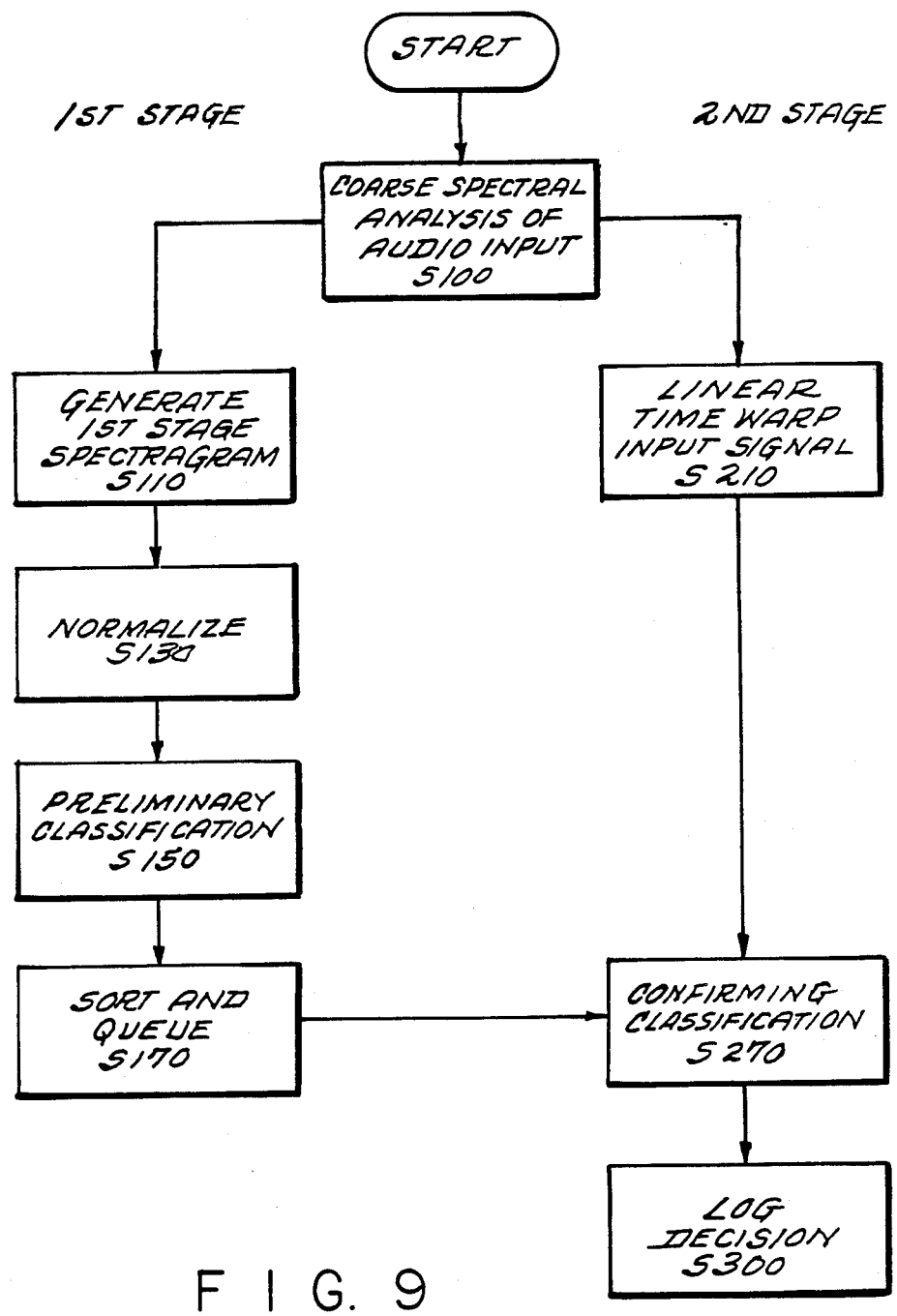
FIG. 9 is a top-level flow chart depicting a method according to the preferred embodiment.

First, an overview of the invention will be provided for clarification purposes. Reference may be had to FIG. 9 for this overview. The automatic recognition of broadcast recordings is useful in determining the rate of play and the time of play of these recordings to determine royalties, projected sales, etc. The prior art in this area has met with limited success due to the necessity of using a relatively large bandwidth product to ensure accuracy. When a suitably large time-bandwidth product is employed, most techniques experience difficulty due to speed variations common in broadcast music stations. In addition, the music computation load imposed by these techniques limits the number of songs or other recordings that can be simultaneously searched for in real time.

The present invention manages the large processing load imposed by a large signature data base through the use of an efficient, though less accurate, first (screening) stage classification process. This first stage eliminates from further consideration songs that are clearly different from the current input signal. Only those patterns that match the input reasonably well in the first stage are queued for intensive scrutiny by the accurate but computationally demanding second stage. This is because the queueing order established in the first stage classification process is ranked by order of similarity to the broadcast song. Thus, the second stage will first consider the most likely candidates before the less likely candidates. Early recognition will result with a corresponding decrease in computer processing power. This two-stage classification process results in a classification system whose overall capacity is increased by over an order of magnitude compared to known classification systems.

The use of additional stages in a hierarchical classification structure could provide additional capacity for a given processing resource. For example, much larger data bases may require a three-stage classification process to again conserve processing power. Those of skill in this field will readily understand that the teachings in this invention may also be applicable to a three-or-more stage classification process.

Figure 1:
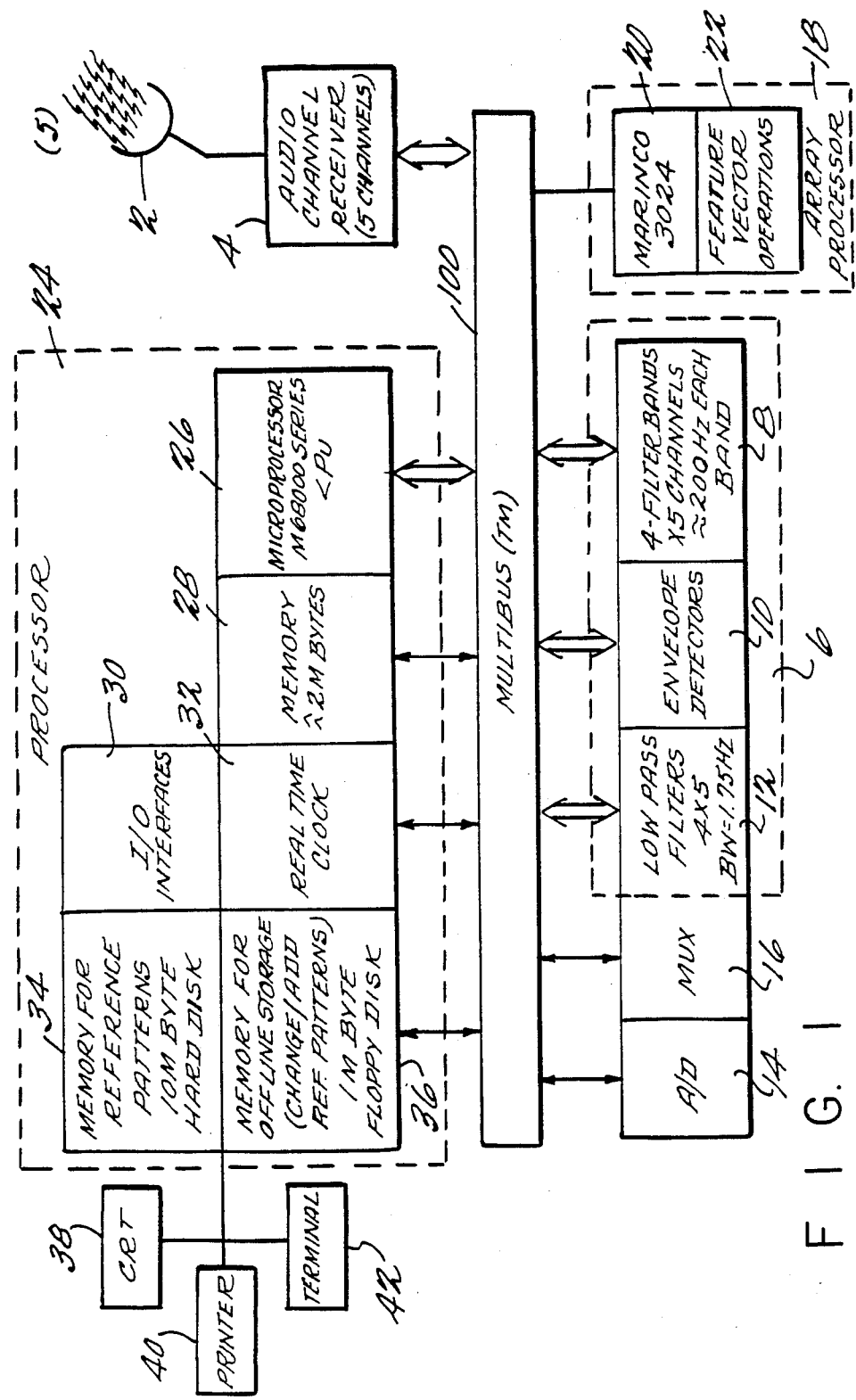
FIG. 1 is a block diagram depicting the system according to the presently preferred embodiment.

FIGS. 1 and 9 depict apparatus and method according to the presently preferred embodiment. The audio signal from one or more broadcase sources is input to an audio channel receiver 4 through antenna means 2. In the present invention, the processing structure of FIG. 1 allows simultaneous processing of up to five audio channels. Therefore, up to five broadcast stations may be monitored and their broadcast programs classified. Additional hardware and software modifications could be performed to increase or decrease the number of channels simultaneously monitored.

From audio channel receiver 4, the input audio signal is provided to an audio preprocessor 6. Audio preprocessor 6 may include filter banks 8, envelope detector 10, and low pass filters 12. The audio preprocessor performs a coarse spectral analysis by bandpass filtering the audio input into several bands. These bands are then envelope detected and lowpass filtered to form several low bandwidth analog channels. Each of these channels is then fed to a processor which performs a feature generation function. Specifically, the processor digitizes and further processes the low bandwidth analog channels to form a feature data set that is analyzed to determine whether it matches one of the patterns of the first stage classification library. In the preferred embodiment, the feature generating processor forms a four-channel sequence by computing linear combinations of the input channels. Each of these feature sequences is then smoothed using an averaging filter, further reducing the bandwidth. These reduced bandwidth sequences are then resampled to form a feature set of very low bandwidth but long duration.

The sequences are then grouped into a spectrogram and used by the first stage classification process to rule out unlikely candidates. In addition, a fifth sequence is generated by the feature generating processor for use in the second stage classification process.

The four input channels are combined in a weighted sum to form a feature sequence with specific properties. In the process of forming the linear combinations, weighting coefficients are used which are specially selected to minimize the influence of broadband impulsive energy. It has been found that this greatly reduces sensitivity to speed variations and amplitude distortions that frequently result from the use of compressors by broadcast stations.

The second stage feature sequence provided by the feature generating processor is not filtered and resampled, but is used at a relatively large bandwidth. Since it is used at this greater bandwidth, a feature sequence that is long enough to provide satisfactory pattern discrimination will be very sensitive to speed variations. To counter this, the sequence is resampled at slightly different rates to form several new sequences that represent the input waveform at different speeds. This process is referred hereinafter as "time warping". A recording that is broadcast faster than normal must be expanded or stretched to replicate the original waveform. Similarly, a recording that is broadcast slower than normal must be compressed. The set of compressed and expanded waveforms comprise a linearly time warped set of replicas of the input feature sequence.

The first classification stage operates on the low bandwidth spectrograms, treating them as time-frequency matrices of the most recent feature data. These spectrograms should be normalized to compensate for gain variations in the broadcast and receive systems.

In the first stage classification process, the most recently generated spectrogram is compared with every reference pattern stored in the first stage reference library. For each first stage reference pattern in the library, a distance is computed between it and the input spectragram. This distance may be computed as the sum of differences between corresponding elements of the input and reference matrices. This distance is a measure of the similarity between the current broadcast song and the subject reference recording. This distance computation is repeated for each pattern in the data base. Songs whose distances are less than a threshold value are considered to be candidate identifications. Those with distances greater than the threshold value are rejected.

To conserve processing resources and insure that the most likely candidates are considered first, the first stage classifications are positioned in a queue according to their distance scores. Patterns that have passed the first stage classification test and entered into the queue are subject to a confirming classification in the second stage. This classification process uses the single channel wider bandwidth feature set, including the time warped replicas. For each entry in the queue, the corresponding single channel reference pattern is compared with each of the time warped replicas of the most recent feature vector. A correlation procedure is employed that involves computing the cross correlation function and then scanning it to select the maximum value. This is repeated for each of the time warped replicas. If the peak correlation value for any of the correlations exceeds a detection threshold, a recognition is declared and the time, date, song identification number, and radio station are entered in a detection log. If none of the songs in the queue passes the confirming classification, the next time segment is analyzed in the same way. In such a fashion, an inexpensive, efficient and accurate broadcast music classification system is realized. Therefore, a small system with limited processing power can monitor several radio channels simultaneously for a large number of songs. This large capacity has an economic advantage in that the revenue producing capability of a single monitoring unit is proportional to the number of songs monitored times the number of stations under surveillance.

The first stage features have a reduced dimensionality and can be computed and evaluated at low computation cost. Nevertheless, the effect of the first stage processing is to reduce the number of song candidates to a small fraction of the data base size. The second stage of classification uses a song signature of significantly higher dimensionality (time band width product) than the first stage, makes song detection decisions only for songs queued in the first stage, and only for those songs which are identified as probable for the first stage. The first stage has a song detection threshold bias towards high detection rates and moderate false alarm rates. The second stage has both high detection rates and low false alarm rates. The net effect of this two stage detection procedure is the ability to monitor a large number of songs over several channels using only limited processing power. Thus, the apparatus and method according to the present invention may provide an economically significant broadcast information classification system.

Turning now to FIG. 1, the apparatus according to the present invention will be described. Antenna 2 receives radio waves including audio signals. The antenna apparatus is capable of receiving up to five radio channels simultaneously. The audio signal is received by audio channel receiver 4, and provided to audio preprocessor 6 through MULTIBUS (TM of Intel Corp.) 100. Audio preprocessor 6 includes filter banks 8, envelope detectors 10, and low pass filters 12. The audio preprocessor 6 will be described in more detail with reference to FIG. 2.

FIG. 1 also depicts analog-to-digital converter 14 which may be used to digitize the audio signal. Multiplexer 16 is used to carry out multiplexing operations when a plurality of audio signals is being simultaneously classified. Both A/D converter 14 and multiplexer 16 are also coupled to MULTIBUS (TM of Intel Corp.) 100.

Also coupled to MULTIBUS (TM of Intel Corp.) 100 is an array processor 18. Array processor 18 comprises a Marinco 3024 CPU 20 and a feature vector operations section 22. Both the feature vector operations section 22 and the CPU 20 are coupled to MULTIBUS (TM of Intel Corp.) 100. The functions of array processor 18 include the time warping of the second stage feature sequence and the second stage correlation computations.

The processor 24 is also coupled to MULTIBUS (TM of Intel Corp.) 100 and performs the functions of control, data-base management, all in/out (I/O) management, and the first stage classification calculations. Processor 24 may include a microprocessor 26, a memory 28, I/O interfaces 30, a real time clock 32, reference pattern memory 34 and off-line memory 36. Preferably, microprocessor 26 may be a Motorola 68000 series microprocessor. Preferably, working memory 28 includes two Megabytes of memory. Likewise pattern memory 34 stores both the first stage and second stage reference libraries and preferably is realized by a 10 Megabyte hard disk. The offline memory 36 may be used to change/add/delete reference patterns from the reference pattern libraries in memory 34. Preferably off-line memory 36 comprises a one Megabit floppy disk.

Finally, the processing system may be coupled with such peripherals as CRT 38, printer 40, and terminal 42. Such peripherals are coupled to the system through I/O interfaces 30.

Figure 2:
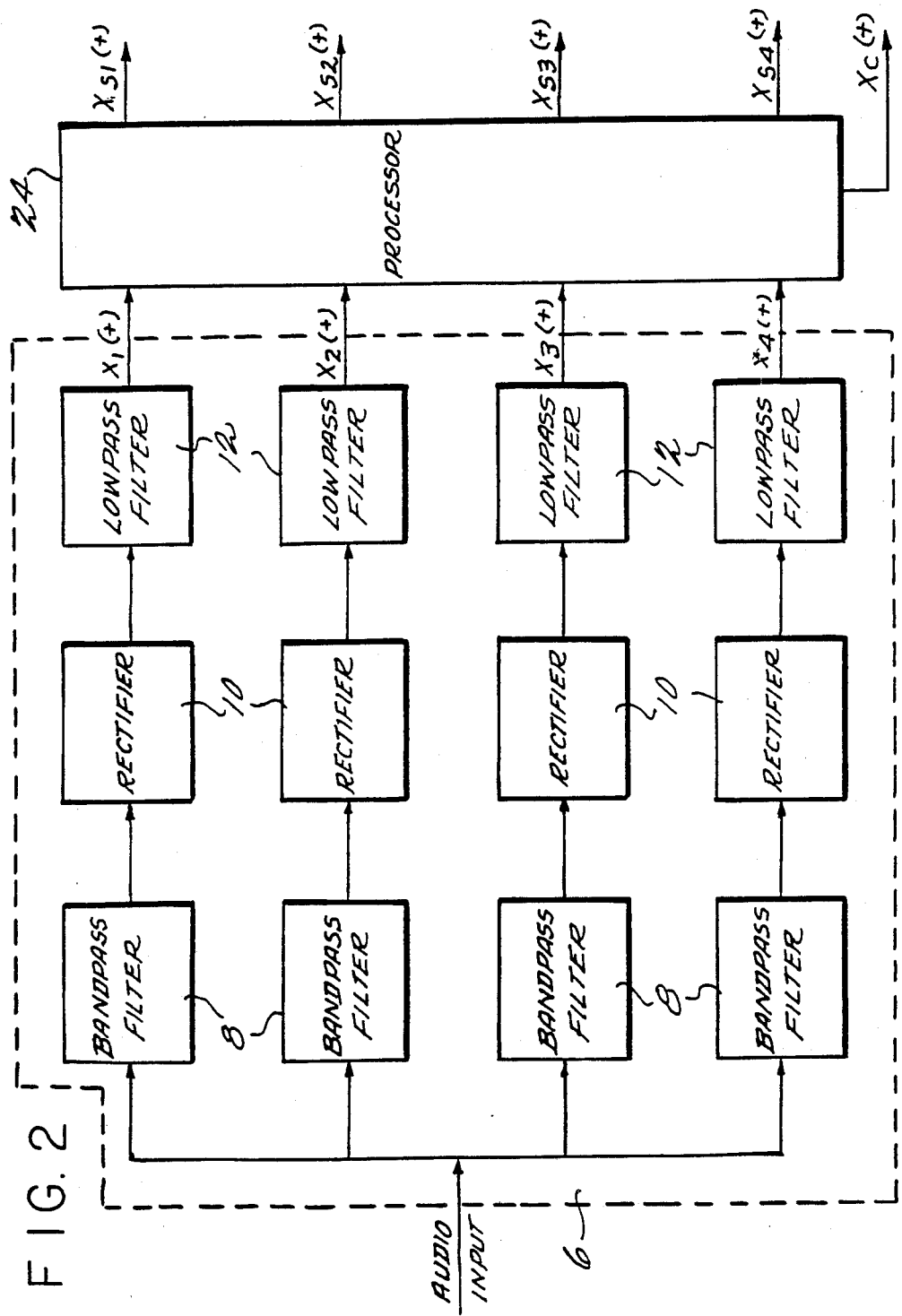
FIG. 2 is a block diagram showing the filter banks of FIG. 1.

Turning now to FIG. 2, the coarse spectral analysis step S100 of FIG. 9 will be described. The received audio signal is provided to audio preprocessor 6 where it is divided into a plurality of channels. In the presently preferred embodiment, four channels have been selected. However, greater or fewer channels may be used depending upon the exact type of information which is to be classified. Each channel includes a bandpass filter 8, a rectifier 10, and a low pass filter 12. The purpose of the audio preprocessor is to reduce the amount of information processed in the first stage. This provides a long term averaging of the first stage features. Since the purpose of the first stage is to reduce the computation required for recognition, it is desirable to reduce the amount of information processed per unit time. Signal discrimination accuracy is proportional to the time bandwidth product of the feature vector. Therefore, by reducing feature vector bandwidth while expanding duration, accuracy is maintained while required processing per unit time is decreased. This is true for any process that requires continuous searching for time series events.

Figure 4:
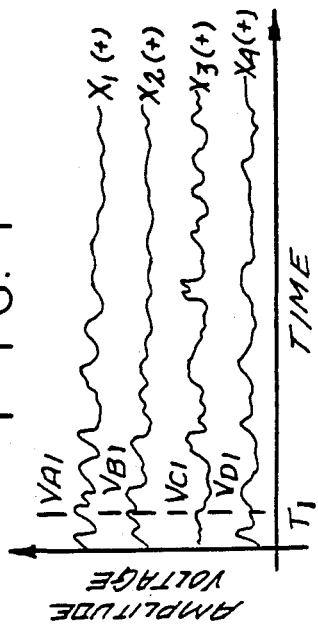
FIG. 4 is a series of waveforms showing four feature sequences generated by the feature generator processor of FIG. 2.
Figure 3:
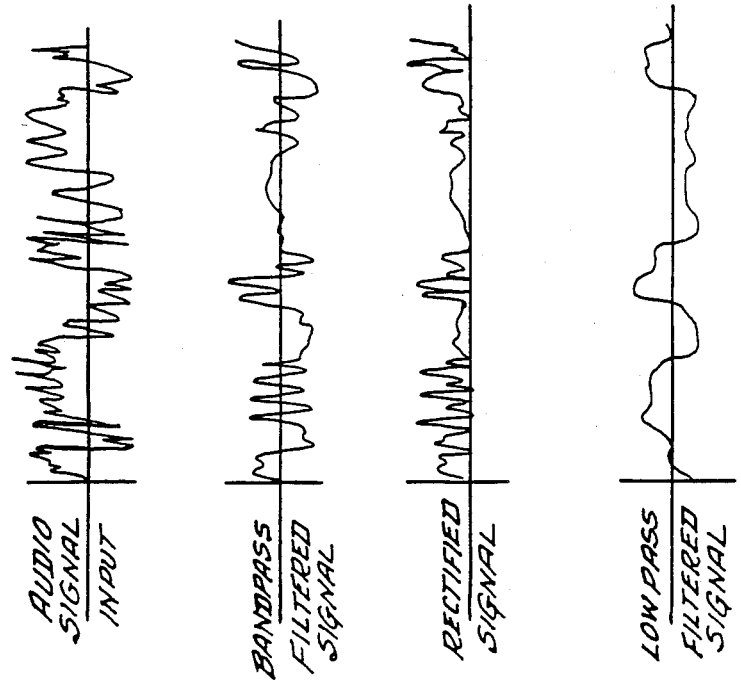
FIG. 3 depicts a series of waveforms showing the wave-shaping carried out in the filter banks of FIG. 2.

In order to accomplish this, the audio input signal depicted in FIG. 3 is provided to each of bandpass filters 8. Each bandpass filter outputs a signal depicted in FIG. 3 as the bandpass filtered signal. The filtered signals are provided to rectifiers 10, each of which outputs a waveform shown in FIG. 3. Finally, the rectified signals are provided to lowpass filters 12, each of which outputs a lowpass filtered signal, as depicted in FIG. 3. By sampling the reduced bandwidth signal, processing time is conserved while simultaneously reducing the sensitivity of the system to speed variations in the audio signal. Therefore, from lowpass filters 12 are provided a plurality of waveforms as depicted in FIG. 4. These waveforms are respectively denoted by $X_1(t)$, $X_2(t)$, $X_3(t)$, and $X_4(t)$. Each of these waveforms is provided to processor 24 which generates feature sequences according to the waveforms.

Processor 24 thus provides a plurality of feature sequences denoted by $X_{S1}(t)$, $X_{S2}(t)$, $X_{S3}(t)$, $X_{S4}(t)$ and $X_c(t)$. Each of these feature sequences is formed as a linear combination of all four waveforms $X_1(t)$ through $X_4(t)$. As shown in FIG. 4, at a time $t_1$ the four waveforms are sampled and amplitude voltages $V_{A1}$, $V_{B1}$, $V_{C1}$ and $V_{D1}$ are respectively measured. Then, for time $t_1$ a feature vector may be calculated for each of the waveforms. The feature vector is a series of numbers describing characteristics of the input signal. In the preferred embodiment, a feature vector for waveform $X_{S1}(t)$ at time $t_1$ may be calculated as follows:

$$XS_1(t)_1 = K_1 V_{A1} + K_2 V_{B1} + K_3 V_{C1} + K_4 V_{D1} \ldots \quad (1)$$

Thus, each sequence of feature vectors includes components from each of the four waveform bands. The coefficients K are selected to specifically suppress noise.

The special selection of coefficients K is used to suppress the effects of amplitude distortion in the broadcast signal. Amplitude distortion (sometimes denoted as "amplitude compression") sometimes is intentionally applied by certain broadcast stations to avoid overdriving inexpensive receivers. Such "amplitude compression" degrades the similarity of a stored reference pattern to that computed from the input radio signal. For a given level of detection of reliability, this requires larger reference patterns to be used than would be necessary if the distortion were not present. The need for large reference patterns causes a reduction in processing efficiency, particularly making it difficult to employ an effective first stage which makes preliminary decisions using song signatures of low dimensionality. The newly developed approach overcomes this distortion problem by taking explicit advantage of the spectral properties of this distortion.

The "amplitude compression" process does not significantly effect narrowband signal components, but primarily affects impulsive components which are wideband in nature. A multi-channel time series consisting of a frequency based time series before compression will be denoted as fi(tj) After compression, each band time series becomes:

$$g_i(t_j) = a_i(t_j) + f_i(t_j) \ldots \quad (2)$$

where compression is described as an additive component $a_i(t_j)$ to each band. In the implemented approach to suppressing effects of amplitude compression, the additive components $a_i(t_j)$ are assumed to be linearly related. Thus, it is assumed that there exists a linear equation which approximately estimates each $a_i(t_j)$ based on the values of $a_k(t_j)$ for $k \neq i$. Thus, $$a_i(t_j) = \sum_{k \neq i} b_{ik} a_k(t_j) + e_i(t_j) \quad (3)$$

where $e_i(t_j)$ is the estimation residual for time $t_j$.

If the $f_i$ may be approximated as independent (which they are not), then the coefficients $b_{ik}$ may by estimated by the correlation process from a data epoch covering time $(t_1, t_M)$ through the solution of the set of $(N-1)$ linear equations:

$$(a_i, a_k) - \sum_{k \neq i} b_{ik}'(a_k', a_k) = 0 \quad (4)$$

for each $k \neq i$ $$\text{where } (a_k, a_{k'}) = \sum_{j=1}^{M} a_k(t_j) a_{k'}(t_j) \quad (5)$$

Since the $[f_k]$ are approximate as independent, it follows that $(a_k, a_{k'}) \cong (g_k, g_{k'})$ for $k' \neq k$.

This estimate of $(a_k, a_{k'})$ is most accurate when the $a_k(t_j)$ take on their largest magnitude in comparison with the $f_k(t_j)$. This occurs when amplitude compression is the greatest. Thus, the estimate is made:

$$(a_k, a_{k'}) \cong (g_k, g_{k'}) \quad (6)$$

$$\text{where } (g_k, g_{k'}) = \Sigma \ g_k(t_j) g_{k'}(t_j) \quad (7)$$

$$\{j : |g(t_j)| > T\}$$

where $|g(t_j)|$ is a measure of the magnitude of the received broadcast signal and T is a selected threshold above which the signal is considered to be heavily compressed.

The set of linear equations is solved for estimates of the $b_{ik}$. Then, the effect of compression is suppressed by replacing received energy band time series $g_i(t_j)$ by:

$$g'_i(t_j) = g_i(t_j) - \sum_{k \neq i} b_{ik} g_k(t_j) \quad (8)$$

To a linear approximation, the N time series $g'_i(t_j)$ have had the effect of compression removed. This approach suppresses linearly dependent information between energy bands and emphasizes linearly independent information. The linearly dependent information can be added, for improved recognition purposes, but must be downweighted because of its vulnerability to amplitude compression.

What is achieved by this method is a set of $g'_i(t_j)$ which are relatively immune to the effects of compression. The coefficients $b_{ik}$ may be estimated using data from an ensemble of broadcast music and transmitting stations so that they do not have to be re-estimated for each broadcast station, and so that they are independent of the music being transmitted.

Sampling of the waveforms in FIG. 4 is preferably conducted at a rate of eight times per second. The bandwidth is preferably 1½ Hz. The Nyquist sampling theory indicates that the sampling rate should be approximately 4 Hz. The present inventors have chose a sampling rate of 8 Hz in order to ensure greater accuracy.

Figure 5:
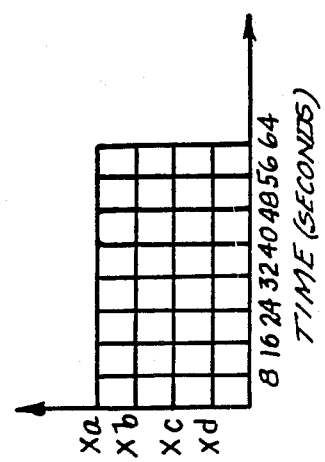
FIG. 5 depicts a spectragram which is constructed with relation to the waveforms shown in FIG. 4.

Referring now to FIG. 5, it can be seen that processor 24 constructs a spectrogram in accordance with the linear combinations of the waveforms of FIG. 4. Thus, as shown in FIG. 5, each block contains data integrated over eight seconds of time. Thus, the spectrogram is a matrix having four spectral channels and eight time channels. Each matrix element contains a feature component calculated as described above. The spectrogram is computed as indicated in step S110 of FIG. 9. This will be described in more detail with reference to FIG. 10.

Figure 10:
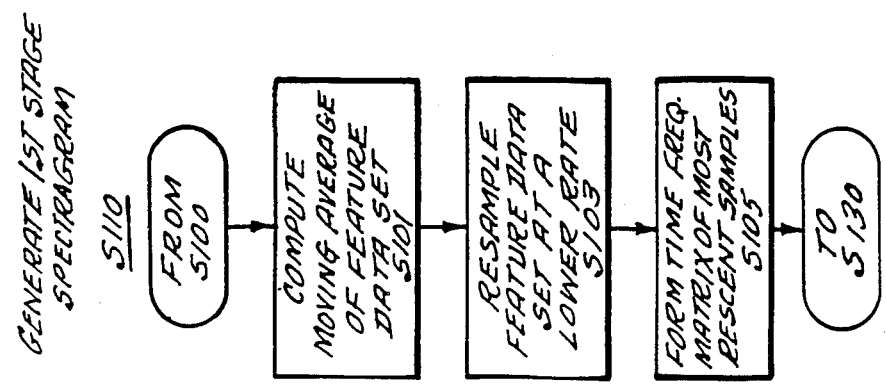
FIG. 10 is a flow chart of one step of FIG. 9.

According to FIG. 10, the feature data sets determined in step S100 are smoothed using a moving average filter, as indicated in step S101. Next, at step S103, the waveforms are resampled to form a low bandwidth multi-channel time series. This has the further advantage of reducing the sensitivity to speed variations. Finally, at step S105 the time/frequency matrix of the most recent sample is formed, as depicted in FIG. 5.

Figure 11:
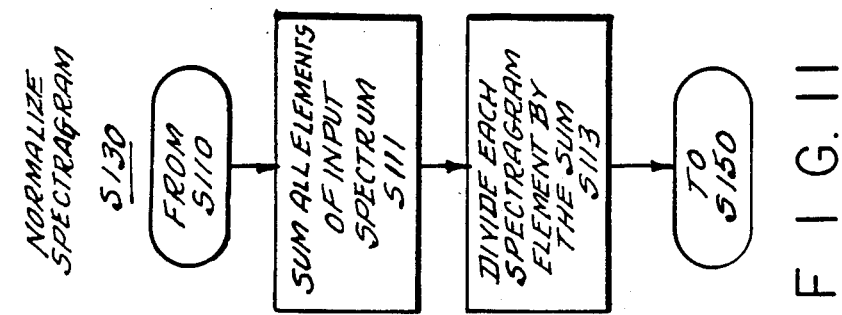
FIG. 11 is a flow chart of another step of FIG. 9.

Once the first stage spectrogram has been generated, the spectrograms should be normalized to compensate for gain variations in the broadcast and receive systems. This step is depicted as S130 in FIG. 9, and is further illustrated in FIG. 11. To accomplish the normalization, all elements of the input spectrogram are summed in step S111. This sum represents the total energy in the spectrogram. Then, at step S113, each element of the spectrogram is divided by the spectrogram sum. This produces a spectrogram with unit energy for easy comparison with the reference pattern.

Figure 13:
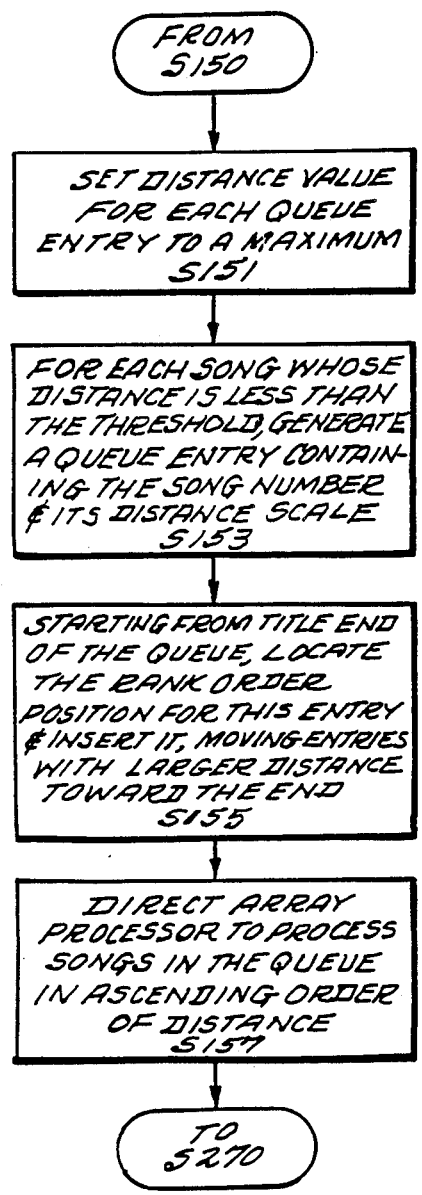
FIG. 13 is a flow chart showing still another step from FIG. 9.

After normalization, the input spectrogram and the reference spectrogram from the first stage reference library are compared in a preliminary classification step S150, as shown in FIGS. 9 and 13. Each element of the input and reference spectrograms preferably includes 16 bits representing the value of the matrix element. As visually depicted in FIGS. 6(a) and 6(b), the first stage comparison is merely a matter of matching the input signal spectrogram with the reference matrix. This process can be visualized as overlaying a reference template on the input signal spectrogram.

Figure 6A:
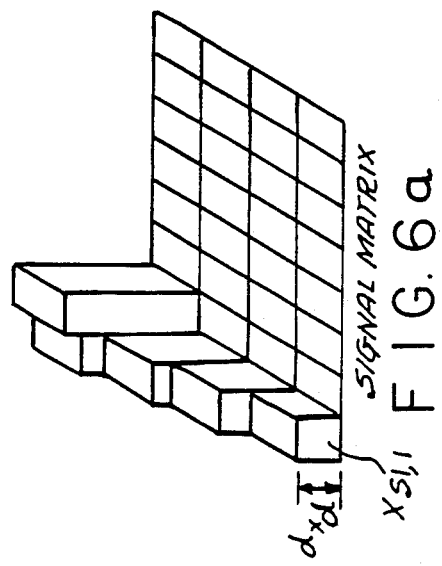
FIGS. 6(a) and 6(b) depict the first stage comparison process carried out between the generated spectragram and the first stage reference matrix.
Figure 6B:
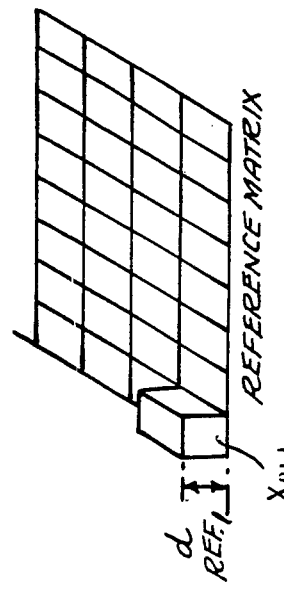
Figure 12:
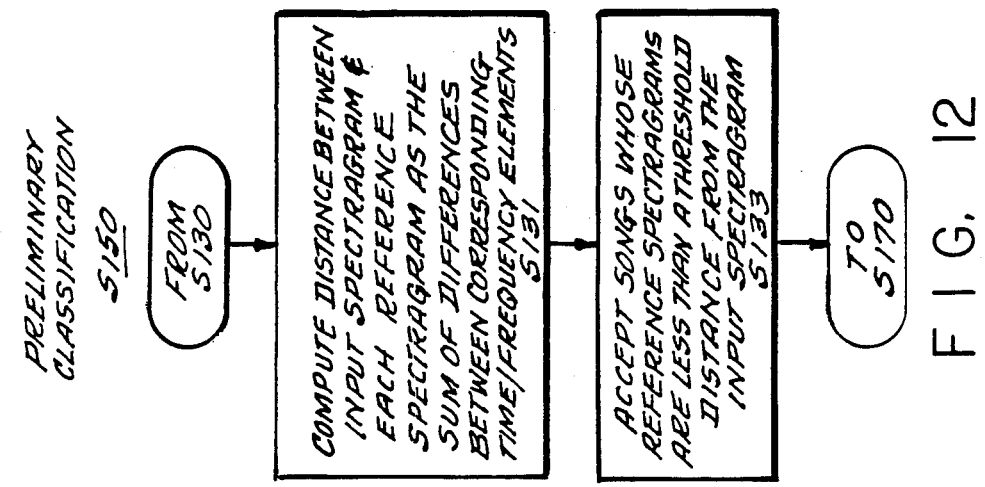
FIG. 12 is a flow chart of yet another step from FIG. 9.

Since each of the signal and reference matrices contains the same number of elements, a 1-to-1 comparison between matrix elements is conducted. As shown in FIGS. 6(a) and 6(b), the value of matrix element $X_{S1,1}$ is compared with matrix element $X_{R1,1}$. This may be visualized as comparing the distances between the two element values. Returning to FIG. 12, the distance between the input spectrogram is determined in step S131. This is accomplished by summing the differences between corresponding time/frequency elements of the signal spectrogram and the reference matrix. This distance calculation is carried out for each of the entries in the first stage reference library.

Next, at step S133, all first stage reference matrices whose distance measurements are less than a predetermined threshold are accepted as likely candidates. Those first stage reference matrices whose distance measurements exceed the threshold are rejected as unlikely candidates.

Once a distance measurement has been calculated for each matrix in the first stage reference library, those songs that are identified as likely candidates are subjected to a sort and queueing step S170, as depicted in FIGS. 9 and 13. As discussed above, by queueing the songs in their order of similarity to the input signal, the computationally demanding second stage classification will be greatly abbreviated. It should be noted that a wide variety of sort and queueing procedures are available for carrying out this step. The inventors have decided to utilize the sorting and queueing procedure depicted in FIG. 13.

At step S151 of FIG. 13, the distance value for each queue entry is set to a maximum. Next, for each song whose distance measurement is less than the threshold value a queue entry is generated containing the song number and its distance score, as shown in step S153. Then, for each new entry into the queue, the queue is scanned from the end to locate the rank order position for the new entry. The new entry is then inserted into the queue at the appropriate space. Entries having a larger distance than the new entry will then be moved toward the end of the queue. This process is depicted in step S155. Lastly, in step 157, the array processor is directed to process songs in the queue in ascending order of distance measurements. Thus, a reference spectrogram which has a low distance value from the input song will be subjected to the second stage classification before a reference spectrogram having a higher distance measurement.

The above-described procedures complete the first stage classification process. The first stage produces a queue ordered by similarity to the input song. This queue order will be used in the second stage classification process to compare the most likely reference songs to the input song.

Second stage classification actually begins with the generation of the wider bandwidth feature sequence $X_c(t)$, as depicted in FIG. 2. As discussed above, it is necessary to "time warp" the second stage feature sequence in order to account for speed variations in the broadcast signal. For purposes of the preferred embodiment, it is assumed that all such speed variations are constant, and thus the time warping feature of the preferred embodiment is a linear time warp.

Radio stations are known to introduce significant speed variations into recordings that are broadcast. For a feature vector with a sufficient time-bandwidth product to provide near error free recognition, most recognition systems are intolerant of these speed variations. This problem has been addressed in the Kenyon et al patent referred to above through the use of a segmented correlation approach. In this approach, short feature vectors with relatively small time-bandwidth products were identified separately. The final recognition decision was based on the timing of individual segment recognitions. While this procedure allowed recognition of songs with substantial speed variation, it did not take full advantage of the fact that these speed differences introduce a linear time base error. The method according to the present invention is to linearly compress or expand the time base of the input feature sequence until the distortion has been removed. The entire feature vector is then compared with undistorted vectors from the reference set. The compression and expansion of the feature vector is performed by resampling and interpolating the input sequence. This linear time warping is done in small enough increments that at least one increment will match the stored reference with essentially no degradation. Such time warping is depicted in FIG. 7.

Figure 7:
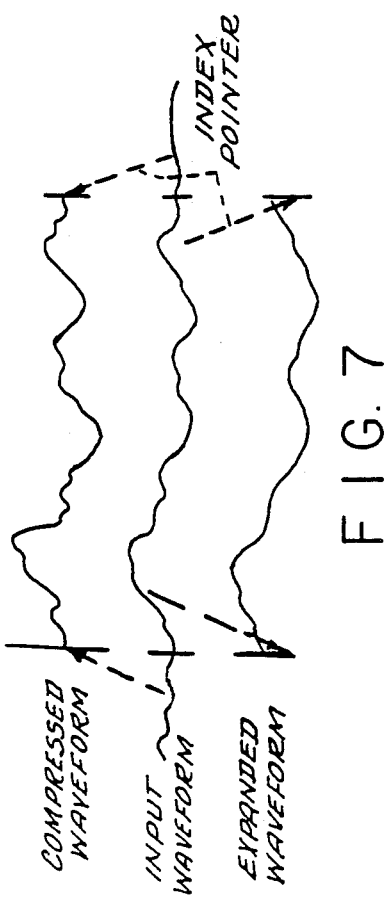
FIG. 7 shows time-warped versions of the input waveform used in the second stage classification process.

As shown in FIG. 7, the input waveform can be compressed into a compressed waveform, and/or stretched into an expanded waveform. According to the preferred embodiment, a set of four time warped waveforms are provided in addition to the un-warped waveform. For purposes of broadcast music recognition, applicants have chosen to provide waveforms compressed by 2% and 4%, and waveforms stretched by 2% and 4%. Thus, two compressed waveforms, two stretched waveforms, and the original waveform are provided for comparison to the second stage reference library.

Next, as depicted by step S270 in FIG. 9, a confirming classification is carried out between the time warped (and un-warped) waveforms and the reference patterns in the second stage reference library according to the queueing order established in step S170.

Generally, this confirmation classification is carried out in accordance with the teachings of the Kenyon et al patent incorporated herein by reference. In brief, a correlation is a mathematical means of measuring how well two waveforms compare. If one of the two waveforms is of finite length and is permanently stored in an appropriate memory storage device, a running comparison of the finite stored waveform against a second continuous waveform may be accomplished through on-line solution of the correlation integral equation to produce a third waveform known as the correlation function. When the continuous waveform contains a signal segment (which may even be obscured by noise) which matches the stored waveform, the correlation function attains a large value. The sensing of this large value constitutes a recognition, and is the process by which the occurrence of a commercial advertisement or song is recognized in the process according to the present invention.

The pattern matching according to the present invention involves a correlation procedure with a minimum of 50% overlap of input data and zero filling of reference patterns so that linear correlations are generated instead of circular correlations. The correlation procedure involves computing the cross correlation function and then scanning it to select the maximum value. This is repeated for each of the time warped replicas. If the peak correlation value for any of the correlations exceeds a detection threshold, a recognition is declared and the classification process for that song is over. The confirmatory classification process will now be described with reference to FIGS. 8 and 13.

Figure 8:
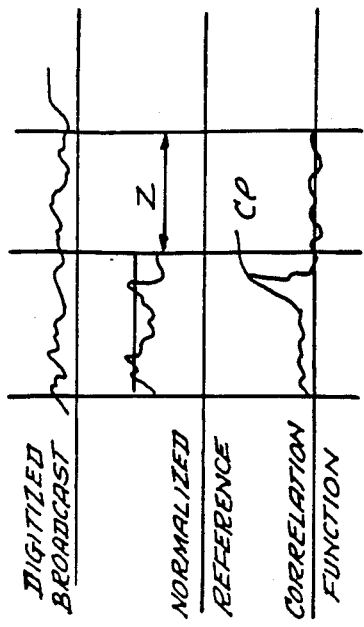
FIG. 8 is a series of waveforms depicting the digitized feature sequence used in the second stage classification process, the normalized second stage reference pattern, and the cross-correlation function therebetween.

In FIG. 8, the digitized broadcast waveform may be on of the time warped (or un-warped) waveforms generated in step S210. For example, this digitized broadcast may represent 512 samples of the audio signal input, taken over a 64 second period. Next, a normalized reference pattern from a second stage reference library is matched to an arbitrary portion on the digitized broadcast waveform. Note that only the first half of the normalized reference contains a waveform, the second half being zero filled. Zero filling is used to accomplish segment splicing which takes the newest reference block and concatenates it to the previous block. Next, a cross correlation is carried out between the digitized broadcast and the normalized reference to provide a correlation function, as depicted in FIG. 8. Note that correlation peak CP indicates a high correlation between the digitized broadcast an the normalized reference at that particular point.

Figure 14:
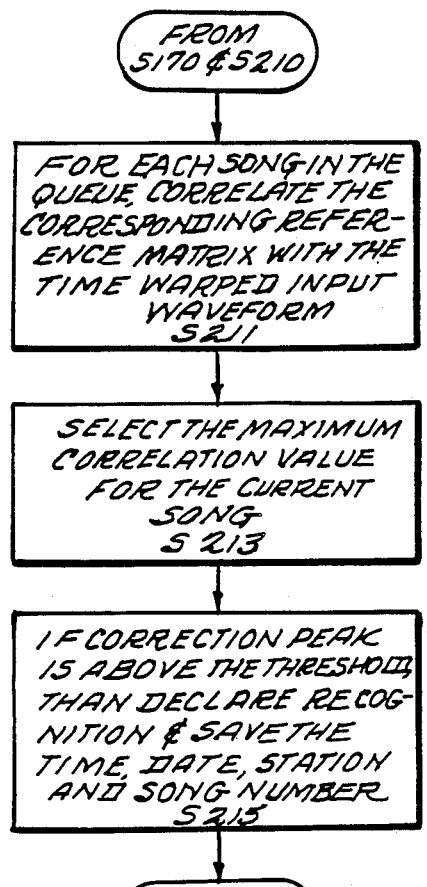
FIG. 14 is a flow chart showing the confirming step according to FIG. 9.

The correlation process is carried out by first computing the Fourier transform of all five time warped and un-warped waveforms. This provides complex conjugate spectra which are compared with the second stage reference patterns. The reference patterns themselves have been previously normalized so that no additional normalization is required for the reference patterns. Next, samples from the digitized broadcast and reference waveform are cross multiplied and inverse Fourier transformed to provide the correlation signal depicted in FIG. 8. Note that the correlation function in the zero filled half of the normalized reference waveform is minimal. Thus, only correlations in the first half of the correlation function are valid. The second half of the correlation function is generated by taking the correlation waveform and essentially reversing it to get a mirror image of the reference waveform. The above-described cross correlation process is depicted at step S211 in FIG. 14.

Next, the correlation functions between each second stage reference pattern and the plurality of time-warped (and un-warped) input signals are compared to select the maximum correlation value for the current input song, as depicted in step S213. The appropriate waveform with the highest correlation value is selected and compared to a threshold value which determines recognition, as depicted in step S215. As soon as a correlation peak value is determined to be above the pre-set threshold, a victory is declared and it is determined that the song has been "recognized". Then, the time of detection, the date, the broadcasting station, and the song number may be derived and provided to output peripheral equipment. Such decision logging may be carried out as step S300, depicted in FIG. 9. This completes the second stage classification process.

Thus, the above-described system and method provides for an accurate, reliable, yet inexpensive system for classifying broadcast information. Those of skill in this field will understand that a wide variety of modifications may be made without departing from the spirit and scope of the subject invention.

An additional advantage of the apparatus according to the present invention is that it may be used to generate the first and second stage reference libraries. This is an automatic training procedure in which broadcast songs are "played into" the system to provide the first and second stage reference patterns. The automatic training procedure first selects the most spectrally distinctive section of the song for use in reference pattern generation. Certain sections of a recording are more spectrally distinctive than others. When such a section is used to generate a reference pattern, the performance of a pattern recognizer is improved since it operates on more information. A measure of the distinctiveness of a portion of a recording is the bandwidth of this feature vector. This can be estimated as follows:

$$B = \left[ \sum_{0}^{W} X(w) \right]^2 / \left[ \sum_{0}^{W} X^2(w) \right] \quad (10)$$

where $X(w)$ represents the power spectral density at any particular frequency. Very large bandwidths can be produced by songs with impulsive features. While these features are distinctive, they are more subject to distortion and require greater processor dynamic range.

Areas containing impulsive features may be located by computing the crest factor as a ratio of the peak feature value to the standard deviation of the feature vector computed in the same region. A composite figure of merit is then computed as either the ratio of, or the difference between, the bandwidth and crest factor of the second stage feature vector. This is repeated in small increments of time (for example one second) throughout the song. At positions where the figure of merit is highest, a first stage reference feature matrix is computed and tested for time alignment sensitivity. For timing errors as large as can be encountered due to offsets and time scale errors, the resultant distance must remain below a threshold value. The position in the song for training is selected as the one with the highest second stage figure of merit that also passes the first stage time sensitivity test. Those of skill in this field will appreciate that the same hardware used to conduct music classification can also be used to generate the first and second stage reference libraries.

Therefore, what has been described above is apparatus and method for automatically classifying broadcast information according to stored reference patterns. Since the system is microprocessor based, it can be realized in an extremely small and economical package. The costs of constructing and installing such systems will be economically advantageous. Those of skill in this field will readily understand the advantages achieved by the structure and functions of the above-described invention.

While the present invention has been described in connection with what is presently considered to be the most practical and preferred embodiments, it is to be understood that the invention is not limited to the disclosed embodiment. To the contrary, the present invention is intended to cover various modifications and equivalent arrangements included within the spirit and scope of the appended claims. The scope of the appended claims is to be accorded the broadest interpretation so as to encompass all such modifications and equivalent structures and functions.

We claim:

1. A method of classifying broadcast information, comprising the steps of:

receiving broadcast information;

performing a spectral analysis of said information and providing a plurality of analyzed waveforms corresponding thereto;

generating a spectrogram from said waveforms;

comparing the generated spectrogram with a plurality of predetermined first stage reference spectragrams;

queueing the first stage reference spectragrams in order of their similarity to said generated spectragram;

correlating at least one of a plurality of predetermined second stage reference patterns which correspond to said first stage reference spectragrams with one of said analyzed waveforms in the queueing order established in the queueing step to provide a correlation value for each of the correlated second stage reference patterns;

monitoring said correlating step to determine when one of said correlation values exceeds a threshold correlation value;

identifying the second stage reference pattern which corresponds to the correlation value which exceeds said threshold value; and classifying the broadcast information as similar to the identified second stage reference pattern.

2. A method according to claim 1 wherein said queueing step includes the step of restricting the queue to only those first stage reference spectragrams which are less than a similarity threshold with respect to said generated spectragram.

3. A method according to claim 1 wherein the step of generating said spectragram includes the steps of:
computing a plurality of linear combinations of said analyzed waveforms;
forming said linear combinations into a multi-channel feature sequence;
smoothing said feature sequence with a moving average filter;
resampling the smoothed feature sequence to provide a low bandwidth feature set; and
forming said feature set into a generated time/frequency spectragram having a matrix of elements.

4. A method according to claim 3 wherein each of said first stage reference spectragrams has a time/frequency matrix of elements, and wherein said step of comparing the generated and reference spectragrams includes the steps of:
(a) calculating a difference between each element of said generated spectragram and a corresponding element of one of said reference spectragrams;
(b) summing the differences between said generated spectragram elements and said one reference spectragram elements;
(c) calculating a distance between said generated spectragram and said one reference spectragram based on the difference sum; and
(d) repeating said steps (a)–(c) for each of said plurality of first stage reference spectragrams.

5. A method according to claim 4 wherein said step of comparing the generated and reference spectragrams includes the further step of:
(e) comparing each of the calculated distances with a threshold distance value, and wherein said queueing step includes the step of queueing only those first stage reference patterns whose corresponding distances fall below said threshold distance value.

6. A method according to claim 1 wherein said step of receiving broadcast information includes the step of simultaneously receiving a plurality of said broadcast information from a corresponding plurality of broadcast sources, and wherein said steps of performing, generating, comparing, queueing, correlating, monitoring, identifying, and classifying are performed on said plurality of broadcast information.

7. A method according to claim 1 wherein said step of performing said spectral analysis includes the steps of:
providing said broadcast information to a plurality of channels;
bandpass filtering, in each channel, said broadcast information to provide a filtered signal in each channel;
rectifying, in each channel, said filtered signal to provide a rectified signal in each channel; and
providing the plurality of rectified, filtered signals to said generating step.

8. A method according to claim 7 wherein said step of bandpass filtering includes the step of providing a different value bandpass filter in each of said channels.

9. A method according to claim 1 wherein said step of correlating includes the steps of:
receiving one of said analyzed waveforms from said performing step;
time warping said one analyzed waveform to provide at least one time warped waveform;
cross correlating said time warped waveform and said at least one second stage reference pattern to provide a plurality of correlation values; and
selecting a maximum correlation value from among said plurality of correlation values.

10. A method according to claim 9 wherein said time warping step includes the step of providing at least one stretched time warped waveform, and wherein said cross correlating step includes the step of independently cross correlating both said stretched waveform and said analyzed waveform with said second stage reference pattern to provide a plurality of correlation values for each of said analyzed waveform and said stretched waveform.

11. A method according to claim 10 wherein said time warping step includes the step of providing at least one compressed time warped waveform, and wherein said cross correlating step includes the step of independently cross correlating said second stage reference pattern with said compressed waveform, said stretched waveform, and said analyzed waveform.

12. A method according to claim 1 further including the training steps of:
receiving a plurality of reference broadcast information;
analyzing each reference broadcast information to determine a most spectrally distinctive section thereof;
generating a first stage reference spectragram for each of said plurality of reference broadcast information from the most distinctive section thereof; and
generating a second stage reference pattern for each of said plurality of reference broadcast information from the most distinctive section thereof.

13. A method according to claim 1 further including the step of normalizing the generated spectragram prior to said comparing step.

14. A method of classifying broadcast information, comprising the steps of:
receiving broadcast information;

comparing said information with a library of first stage reference patterns;

queueing the first stage reference patterns in an order of their similarity to said information;

correlating the broadcast information with a library of second stage reference patterns, which correspond to said first stage reference patterns, in the queueing order established in the queueing step; and classifying said broadcast information as similar to one of said second stage reference patterns based on said correlating step.

15. A method according to claim 14 further including the steps of:

generating a plurality of analyzed waveforms from said broadcast information;

time warping one of said analyzed waveforms to provide at least one time warped waveform; and wherein said correlating step includes the step of correlating both said one analyzed waveform and said time warped waveform with said library of second stage reference patterns.

16. A method according to claim 15 wherein said time warping step includes the step of linearly time warping said one analyzed waveform to provide a stretched waveform.

17. A method according to claim 14 wherein said receiving step includes the step of simultaneously receiving a plurality of broadcast information, and wherein said steps of comparing, queueing, correlating, and classifying are performed on said plurality of broadcast information, substantially simultaneously.

18. A method according to claim 14 further including the steps of:

processing said broadcast information to provide a plurality N of analyzed signal patterns corresponding to said broadcast information;

generating a spectrogram from said analyzed signal patterns;

providing said spectrogram to said comparing step for comparison to said first stage reference patterns; and providing one of said analyzed signal patterns to said correlating step for correlation with said second stage reference patterns.

19. A method according to claim 18 wherein said step of processing includes the steps of:

bandpass filtering said broadcast information into a plurality of bands; and computing a plurality of linear combinations of said plurality of bands to provide said plurality of analyzed signal patterns.

20. A method according to claim 19 wherein said step of bandpass filtering includes the steps of bandpass filtering, rectifying, and then lowpass filtering each said band.

21. A method according to claim 18 wherein said step of generating a spectrogram includes the steps of:

sampling said plurality of analyzed signal patterns at a predetermined rate;

constructing a time/frequency matrix having N frequency channels, n time channels, and a plurality of N(n) of matrix elements;

calculating, for each matrix element, a matrix value $X_{N,n}$ as follows:

$$X_{N,n}(t) = [K_1 \times V_{An}(t)] + \ldots [K_N \times V_{Nn}(t)]$$

where:

t equals time at which samples are taken from said plurality of analyzed signal patterns;

$V_{An}$ through $V_{Nn}$ are amplitude values of first through $N^{th}$ analyzed signal patterns taken at sample time t; and $K_1$ through $K_N$ are constants preselected to minimize the influence of broadband impulsive energy.

22. A method according to claim 21 further including the step of normalizing said matrix to provide said spectragram.

23. A method according to claim 21 wherein each said first stage reference pattern comprises an Nxn reference matrix of elements, and wherein said step of comparing comprises the steps of:

measuring a variation between each element of the time/frequency matrix and a corresponding element of each of said reference matrices;

summing the measured variations between the time/frequency matrix and each reference matrix to provide a distance measurement for each reference matrix;

comparing each distance measurement with a threshold value; and eliminating those first stage reference patterns whose corresponding distance measurement exceeds said threshold value.

24. A method according to claim 23 wherein said queueing step comprises the step of ordering non-eliminated first stage reference patterns according to their corresponding distance measurements.

25. A method according to claim 14 wherein said correlating step includes the steps of:

calculating a correlation value for at least one second stage reference pattern with reference to said broadcast information; and comparing said correlation value with a threshold correlation value; and wherein said classifying step includes the step of classifying said broadcast information as similar to only the second stage reference pattern whose corresponding correlation value exceeds said threshold reference value.

26. A method according to claim 14 further including the training steps of:

(a) analyzing reference broadcast information to identify a spectrally distinctive portion thereof;

(b) determining a figure of merit for said distinctive portion using a peak value and a standard deviation value from said distinctive portion;

(c) generating a first stage reference pattern from said distinctive portion;

(d) testing the generated first stage reference pattern for time alignment sensitivity;

(e) repeating said steps (a)-(d) when the generated first stage reference pattern does not pass the time sensitivity test; and (f) using said spectrally distinctive portion to provide first and second stage reference patterns when said generated first stage reference pattern passe the time sensitivity test.

27. A method of classifying broadcast information, comprising the steps of:

comparing a portion of received broadcast information with a library of first stage reference patterns;

queueing said first stage reference patterns in an order of their similarity to said broadcast information portion;

correlating said portion with a library of second stage reference patterns in the queueing order established in said queueing step, said second stage reference patterns corresponding to said first stage reference patterns; and classifying said broadcast information as similar to one of said second stage reference patterns based on said correlating step.

28. A method according to claim 27 further including the steps of:

receiving said broadcast information;

processing said broadcast to provide a plurality of spectrally distinguishable waveforms;

processing said waveforms to provide processed spectral information corresponding to said waveforms;

and wherein said comparing step compares said processed spectral information with said first stage reference patterns.

29. A method according to claim 28 wherein said step of processing said waveforms includes the step of processing said waveforms to provide a spectrogram matrix having N(n) elements, and wherein each of said first stage reference patterns includes a reference matrix having N(n) elements;

measuring a distance value between each element of said reference matrix and a corresponding element of said spectragram matrix; and summing distance values for all of said spectragram and reference matrix elements to provide a difference measurement for each reference matrix with respect to said spectragram matrix.

30. A method according to claim 29 wherein said queueing step comprises the steps of:

disregarding those reference matrices whose corresponding difference measurements exceed a predetermined threshold; and queueing non-disregarded reference matrices according to their respective difference measurements.

31. A method according to claim 27 wherein said comparing step includes the steps of:

receiving said broadcast information;

processing said broadcast information to provide a plurality of waveforms; and processing said waveforms to provide a plurality of feature sequences which are linear combinations of said waveforms;

and wherein said correlating step includes the steps of:

cross-correlating one of said feature sequences with said second stage reference patterns until a cross correlation value corresponding to one of said second stage reference patterns exceeds a predetermined threshold.

32. A method according to claim 31 further including the step of: to provide a time-expanded feature sequence and a time-compressed feature sequence;

and wherein said cross-correlating step includes the step of cross-correlating said second stage reference pattern with at least one of said time-expanded feature sequence, said time-compressed feature sequence, and said one feature sequence.

33. A method according to claim 27 further including the training steps of:

providing a plurality of reference information;

analyzing each of said reference information to identify a spectrally distinctive portion thereof;

generating a first stage reference pattern from said distinctive portion;

testing the generated first stage reference pattern for time alignment sensitivity; and generating a second stage reference pattern from said distinctive portion when the generated first stage reference pattern passes the time alignment sensitivity test.

34. Apparatus for classifying broadcast information, comprising:

means for receiving broadcast information;

means for performing a spectral analysis of said information and providing a plurality of analyzed waveforms corresponding thereto;

processing means for (a) generating a spectrogram from said waveforms; (b) comparing the generated spectrogram with a plurality of predetermined first stage reference spectragrams; (c) queueing the first stage reference spectragrams in order of their similarity to said generated spectragram; (d) correlating at least one of a plurality of predetermined second stage reference patterns which correspond to said first stage reference spectragrams with one of said analyzed waveforms in the queueing order established to provide a correlation value for each of the correlated second stage reference patterns; (e) monitoring the correlation to determine when one of said correlation values exceeds a threshold correlation value; (f) identifying the second stage reference pattern which corresponds to the correlation value which exceeds said threshold value; and (g) classifying the broadcast information as similar to the identified second stage reference pattern.

35. Apparatus according to claim 34 wherein said processing means restricts the queue to only those first stage reference spectragrams which are less than a similarity threshold with respect to said generated spectragram.

36. Apparatus according to claim 34 wherein said processing means (a1) computes a plurality of linear combinations of said analyzed waveforms; (a2) forms said linear combinations into a multi-channel feature sequence; (a3) smooths said feature sequence with a moving average filter; resamples the smoothed feature sequence to provide a low bandwidth feature set; and (a5) forms said feature set into a generated time/frequency spectragram having a matrix of elements.

37. Apparatus according to claim 36 wherein each of said first stage reference spectragrams has a time/frequency matrix of elements, and wherein said processing means (b1) calculates a difference between each element of said generated spectragram and a corresponding element of one of said reference spectragrams; (b2) sums the differences between said generated spectragram elements and said one reference spectragram elements; (b3) calculates a distance between said generated spectragram and said one reference spectragrm based on the difference sum; and (b4) repeats the functions (b1)–(b4) for each of said plurality of first stage reference spectragrams.

38. Apparatus according to claim 37 wherein said processing means (b5) compares each of the calculated distances with a threshold distance value, and wherein said processing means queues only those first stage reference patterns whose corresponding distances fall below said threshold distance value.

39. Apparatus according to claim 34 wherein said means for receiving broadcast information simultaneously receives a plurality of said broadcast information from a corresponding plurality of broadcast sources, and wherein said means for performing and said processing means for (a) generating, (b) comparing, (c) queueing, (d) correlating, (e) monitoring, (f) identifying, and (g) classifying carries out these functions on said plurality of broadcast information.

40. Apparatus according to claim 34 wherein said means for performing said spectral analysis includes:
   means for providing said broadcast information to a plurality of channels;
   means for bandpass filtering, in each channel, said broadcast information to provide a filtered signal in each channel;
   means for rectifying, in each channel, said filtered signal to provide a rectified signal in each channel; and
   means for providing the plurality of rectified, filtered signals to said processing means.

41. Apparatus according to claim 40 wherein said means for bandpass filtering includes a different value bandpass filter in each of said channels.

42. Apparatus according to claim 34 wherein said processing means (d1) receives one of said analyzed waveforms from said means for performing; (d2) time warps said one analyzed waveform to provide at least one time warped waveform; (d3) cross correlates said time warped waveform with said at least one second stage reference pattern to provide a plurality of correlation values; and (d4) selects a maximum correlation value from among said plurality of correlation values.

43. Apparatus according to claim 42 wherein said processing means provides at least one stretched time warped waveform, and wherein said processing means independently cross correlates both said stretched waveform and said analyzed waveform with said second stage reference pattern to provide a plurality of correlation values for each of said analyzed waveform and said stretched waveform.

44. Apparatus according to claim 43 wherein said processing means provides at least one compressed time warped waveform, and wherein said processing means independently cross correlates said second stage reference pattern with said compressed waveform, said stretched waveform, and said analyzed waveform.

45. A method according to claim 34 wherein said processing means (t1) receives a plurality of reference broadcast information; (t2) analyzes each reference broadcast information to determine a most spectrally distinctive section thereof; (t3) generates a first stage reference spectragram for each of said plurality of reference broadcast information from the most distinctive section thereof; and (t4) generates a second stage reference pattern for each of said plurality of reference broadcast information from the most distinctive section thereof.

46. Apparatus according to claim 34 wherein said processing means normalizes the generated spectragram prior to said comparison.

47. Apparatus for classifying broadcast information, comprising:
   means for receiving broadcast information;
   processing means for (a) comparing said information with a library of first stage reference patterns; (b) queueing the first stage reference patterns in an order of their similarity to said information; (c) correlating the broadcast information with a library of second stage reference patterns, which correspond to said first stage reference patterns, in the queueing order established; and (d) classifying said broadcast information as similar to one of said second stage reference patterns based on said correlation.

48. Apparatus according to claim 47 further including means for generating a plurality of analyzed waveforms from said broadcast information;
   and wherein said processing means (a1) time warps one of said analyzed waveforms to provide at least one time warped waveform; and wherein said processing means correlates both said one analyzed waveform and said time warped waveform with said library of second stage reference patterns.

49. Apparatus according to claim 48 wherein said processing means linearly time warp said one analyzed waveform to provide a stretched waveform.

50. Apparatus according to claim 47 wherein said means for receiving includes means for simultaneously receiving a plurality of broadcast information, and wherein said processing means performs the processing functions (a)–(d) on said plurality of broadcast information, substantially simultaneously.

51. Apparatus according to claim 47, wherein said processing means (a1) processes said broadcast information to provide a plurality N of analyzed signal patterns corresponding to said broadcast information; (a2) generates a spectragram from said analyzed signal patterns; (a3) provides said spectragram for comparison to said first stage reference patterns; and (a4) provides one of said analyzed signal patterns for correlation with said second stage reference patterns.

52. Apparatus according to claim 51 wherein said processing means (a1a) bandpass filters said broadcast information into a plurality of bands; and (a1b) computes a plurality of linear combinations of said plurality of bands to provide said plurality of analyzed signal patterns.

53. Apparatus according to claim 52 wherein said processing means rectifies, and then lowpass filters each said band.

54. A method according to claim 51 wherein said processing means (a2a) samples said plurality of analyzed signal patterns at a predetermined rate; (a2b) constructs a time/frequency matrix having N frequency channels, n time channels, and a plurality of N(n) of matrix elements; and (a2c) calculates, for each matrix element, a matrix value $X_{N,n}$ as follows:

$$X_{N,n}(t) = [K_I \times V_{An}(t)] + \ldots [K_N \times V_{Nn}(t)]$$

where:
   t equals time at which samples are taken from said plurality of analyzed signal patterns;
   $V_{An}$ through $V_{Nn}$ are amplitude values of first through $N^{th}$ analyzed signal patterns; taken at sample time t; and
   $K_I$ through $K_N$ are constants preselected to minimize the influence of broadband impulsive energy.

55. A method according to claim 54 wherein said processing means normalizes said matrix to provide said spectragram.

56. Apparatus according to claim 54 wherein each first stage reference pattern comprises an Nxn reference matrix of elements, and wherein said processing means (a5) measures a variation between each element of the time/frequency matrix and a corresponding element of each of said reference matrices; (a6) sums the measured variations between the time/frequency matrix and each reference matrix to provide a distance measurement of each reference matrix; (a7) compares each distance measurement with a threshold value; and (a8) eliminates those first stage reference patterns whose corresponding distance measurement exceeds said threshold value.

57. Apparatus according to claim 56 wherein said processing means queues non-eliminated first stage reference patterns according to their corresponding distance measurements.

58. Apparatus according to claim 47 wherein said processing means (c1) calculates a correlation value for at least one second stage reference pattern with reference to said broadcast information; and (c2) compares said correlation value with a threshold correlation value; and wherein said processing means classifies said broadcast information as similar to only the second stage reference pattern whose corresponding correlation value exceeds said threshold reference value.

59. Apparatus according to claim 47 wherein said processing means analyzes said broadcast information to identify a spectrally distinctive portion thereof; (f) determines a figure of merit for said distinctive portion using a peak value and a peak value standard deviation from said distinctive portion; (g) generates a first stage reference pattern from said distinctive portion; (h) tests the generated first stage reference pattern for time alignment sensitivity; (i) repeats the functions (e)–(h) when the generated first stage reference pattern does not pass the time sensitivity test; and uses said spectrally distinctive portion to provide first and second stage reference patterns when said generated first stage reference pattern passes the time sensitivity test.

60. Apparatus for classifying broadcast information, comprising:
means for receiving said broadcast information; and processing means for (a) comparing a portion of the received broadcast information with a library of first stage reference patterns; (b) queueing said first stage reference patterns in an order of their similarity to said broadcast information portion; (c) correlating said portion with a library of second stage reference patterns in the queueing order established in said queueing step, said second stage reference patterns corresponding to said first stage reference patterns; and (d) classifying said broadcast information as similar to one of said second stage reference patterns based on said correlating step.

61. Apparatus according to claim 60 further including means for receiving said broadcast information; means for processing said broadcast to provide a plurality of spectrally distinguishable waveforms; and wherein said processing means (i) processes said waveforms to provide processed spectral information corresponding to said waveforms; and (ii) compares said processed spectral information with said first stage reference patterns.

62. Apparatus according to claim 61 wherein said processing means (ia) processes said waveforms to provide a spectragram matrix having Nxn elements, wherein each of said first stage reference patterns includes a reference matrix having Nxn elements, (iia) measures a distance value between each element of said reference matrix and a corresponding element of said spectragram matrix, and (iib) sums distance values for all of said spectragram and reference matrix elements to provide a difference measurement for each reference matrix with respect to said spectragram matrix.

63. Apparatus according to claim 62 wherein said processing means (b1) disregards those reference matrices whose corresponding difference measurements exceed a predetermined threshold, and (b2) queues non-disregarded reference matrices according to their respective difference measurements.

64. Apparatus according to claim 60 wherein said processing means (a1) processes said broadcast information to provide a plurality of waveforms, and (a2) processes said waveforms to provide a plurality of feature sequences which are linear combinations of said waveforms; and wherein said processing means (c1) cross-correlates one of said feature sequences with said second stage reference patterns until a cross correlation value corresponding to one of said second stage reference patterns exceeds a predetermined threshold.

65. Apparatus according to claim 64 wherein said processing means (ci) time warps said one feature sequence to provide a time-expanded feature sequence and a time-compressed feature sequence, and wherein said processing means (c2) cross-correlates said second stage reference pattern with at least one of said time-expanded feature sequence, said time-compressed feature sequence, and said one feature sequence.

66. Apparatus according to claim 60 wherein said processing means (t1) provides a plurality of reference information, (t2) analyzes each of said reference information to identify a spectrally distinctive portion thereof, (t3) generates a first stage reference pattern from said distinctive portion; (t4) tests the generated first stage reference pattern for time alignment sensitivity; and (t5) generates a second stage reference pattern from said distinctive portion when the generated first stage reference pattern passes the time alignment sensitivity test.

* * * * *